(12) United States Patent
Lecomte et al.

(10) Patent No.: US 8,555,003 B2
(45) Date of Patent: Oct. 8, 2013

(54) NOTIFYING SOFTWARE COMPONENTS USING A SHARED PHYSICAL STORAGE MEDIUM

(75) Inventors: Olivier Lecomte, Sunnyvale, CA (US);
Satyam B. Vaghani, San Jose, CA (US);
Daniel J. Scales, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 132 days.

(21) Appl. No.: 13/172,551

(22) Filed: Jun. 29, 2011

(65) Prior Publication Data

US 2011/0258626 A1 Oct. 20, 2011

Related U.S. Application Data

(60) Continuation of application No. 12/732,856, filed on Mar. 26, 2010, now Pat. No. 8,001,322, and a division of application No. 11/649,501, filed on Jan. 3, 2007, now Pat. No. 7,694,101.

(60) Provisional application No. 60/756,322, filed on Dec. 30, 2005.

(51) Int. Cl.
*G06F 12/00* (2006.01)

(52) U.S. Cl.
USPC ........... 711/147; 711/170; 711/163; 711/112; 711/E12.002; 710/200; 718/1; 709/245; 709/248

(58) Field of Classification Search
USPC ................ 711/112, 114, 170, 163, 164, 147, 711/148, E12.001, E12.002; 714/4, 6; 707/999.01; 709/245, 248; 710/200; 718/1
See application file for complete search history.

(56) References Cited

U.S. PATENT DOCUMENTS

| | | | |
|---|---|---|---|
| 6,058,113 A | 5/2000 | Chang | |
| 6,654,902 B1 * | 11/2003 | Brunelle et al. | 714/4.5 |
| 6,871,222 B1 | 3/2005 | Frank et al. | |
| 7,085,867 B2 * | 8/2006 | Qi | 710/200 |
| 7,231,461 B2 * | 6/2007 | Laschkewitsch et al. | 709/248 |
| 7,243,437 B1 * | 7/2007 | Estrada | 33/539 |
| 7,272,674 B1 * | 9/2007 | Nandi et al. | 710/38 |
| 7,346,801 B2 * | 3/2008 | Brunelle et al. | 714/4.5 |
| 7,424,710 B1 * | 9/2008 | Nelson et al. | 718/1 |
| 7,487,308 B1 | 2/2009 | Dalal et al. | |
| 7,526,538 B2 * | 4/2009 | Wilson | 709/220 |
| 7,953,890 B1 * | 5/2011 | Katkar et al. | 709/245 |
| 2001/0000709 A1 * | 5/2001 | Takahashi et al. | 705/51 |
| 2002/0019683 A1 | 2/2002 | White et al. | |
| 2004/0088336 A1 | 5/2004 | Pasupathy | |
| 2004/0153711 A1 * | 8/2004 | Brunelle et al. | 714/4 |
| 2004/0184452 A1 * | 9/2004 | Huotari et al. | 370/384 |
| 2005/0091419 A1 | 4/2005 | Ohashi et al. | |

(Continued)

*Primary Examiner* — Pierre-Michel Bataille (57) ABSTRACT

Techniques for updating a cached version of data in a computer system upon a change of the data as stored in a shared storage system networked to the computer system are described. In accordance with such techniques, a notification from the shared storage system is received at the computer system upon attempting to access the shared storage system. The computer system then determines that the notification occurred due to an unregistering of the computer system's access to the shared storage system by a second computer system that has updated the data stored in the shared storage system. As such, the computer system re-registers its access to the shared storage system and updates the cached version of the data with the data in the shared storage system that was updated by the second computer system.

22 Claims, 6 Drawing Sheets

(56) References Cited

U.S. PATENT DOCUMENTS

2005/0136926 A1* 6/2005 Tammi et al. .............. 455/435.1
2005/0240773 A1* 10/2005 Hilbert et al. ................ 713/182
2007/0043897 A1 2/2007 Blacquiere et al.

* cited by examiner

NOTIFYING SOFTWARE COMPONENTS USING A SHARED PHYSICAL STORAGE MEDIUM

CROSS-REFERENCE TO RELATED APPLICATION(S)

This application is a continuation of and claims the benefit of U.S. patent application Ser. No. 12/732,856, filed on Mar. 26, 2010, now issued as U.S. Pat. No. 8,001,322, which claims the benefit of U.S. patent application Ser. No. 11/649,501, filed on 3 Jan. 2007, now issued as U.S. Pat. No. 7,694,101, which claims the benefit of U.S. Provisional Application Ser. No. 60/756,322, filed on Dec. 30, 2005 and entitled "SYSTEM AND METHOD OF EMULATING VIRTUAL SCSI RESERVATIONS ON A GENERAL PURPOSE DISTRIBUTED FILE SYSTEM," all of which are incorporated herein in their entirety.

TECHNICAL FIELD

The present invention relates generally to digital computer systems. More specifically, the present invention pertains to notifying software components using a shared physical storage medium.

BACKGROUND ART

The advantages of virtual machine technology have become widely recognized. Among these advantages is the ability to run multiple virtual machines on a single host platform. This makes better use of the capacity of the hardware, while still ensuring that each user enjoys the features of a "complete" computer. Depending on how it is implemented, virtualization can also provide greater security, since the virtualization can isolate potentially unstable or unsafe software so that it cannot adversely affect the hardware state or system files required for running the physical (as opposed to virtual) hardware.

Figure 1:
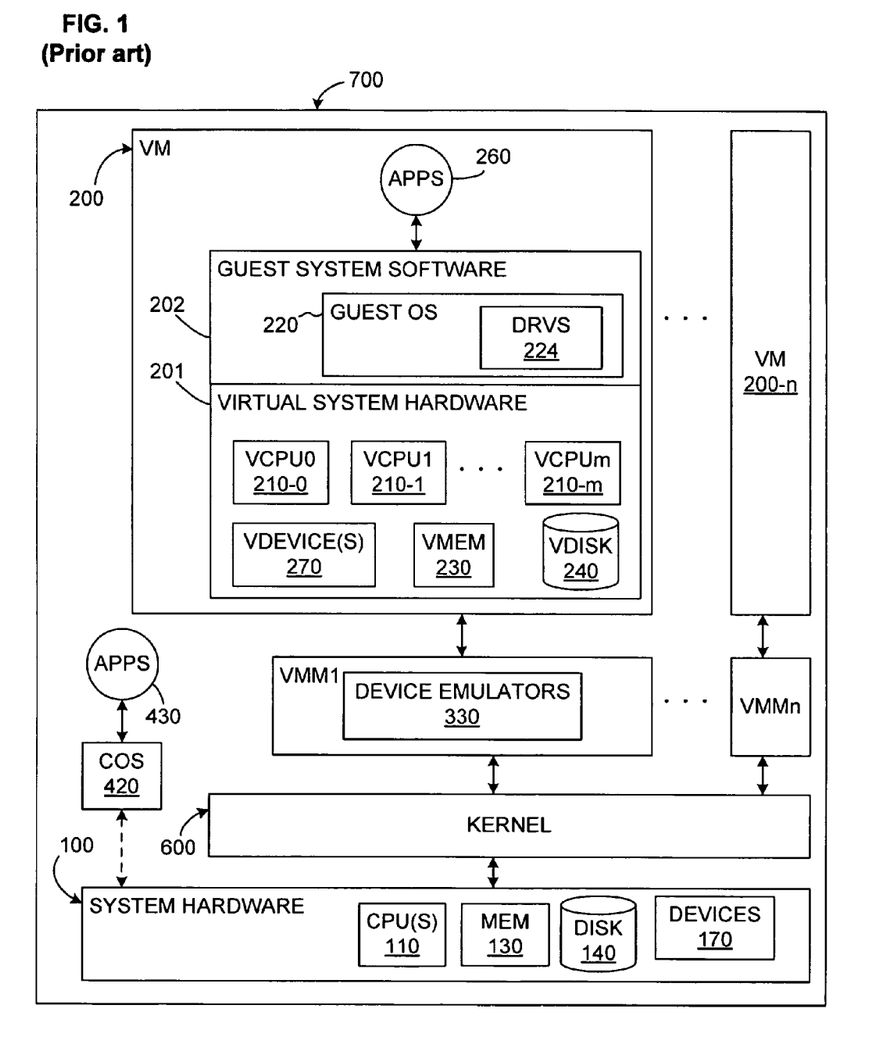
FIG. 1 shows a diagram of a computer system configured for supporting multiple virtual machines and virtual machine applications.

FIG. 1 shows one possible arrangement of a computer system 700 that implements virtualization. As is well known in the field of computer science, a virtual machine (VM) is an abstraction—a "virtualization"—of an actual physical computer system. A virtual machine (VM) or "guest" 200 is installed on a "host platform," or simply "host," which will include system hardware, that is, a hardware platform 100, and one or more layers or co-resident components comprising system-level software, such as an operating system or similar kernel, or a virtual machine monitor or hypervisor (see below), or some combination of these. The system hardware typically includes one or more processors 110, memory 130, some form of mass storage 140, and various other devices 170.

Each VM 200 will typically have both virtual system hardware 201 and guest system software 202. The virtual system hardware typically includes at least one virtual CPU, virtual memory 230, at least one virtual disk 240, and one or more virtual devices 270. Note that a disk—virtual or physical—is also a "device," but is usually considered separately because of the important role of the disk. All of the virtual hardware components of the VM may be implemented in software using known techniques to emulate the corresponding physical components. The guest system software includes a guest operating system (OS) 220 and drivers 224 as needed for the various virtual devices 270.

An objective of the VM 200 is to ensure that applications 260 running on the VM will function as they would if run on a "real" computer, even though the applications are running at least partially indirectly, that is via the guest OS 220 and virtual processor(s). Executable files will be accessed by the guest OS from the virtual disk 240 or virtual memory 230, which will be portions of the actual physical disk 140 or memory 130 allocated to that VM. Once an application is installed within the VM, the guest OS retrieves files from the virtual disk just as if the files had been pre-stored as the result of a conventional installation of the application.

Some interface is generally required between the guest software within a VM and the various hardware components and devices in the underlying hardware platform. This interface—which may be referred to generally as "virtualization software"—may include one or more software components and/or layers, possibly including one or more of the software components known in the field of virtual machine technology as "virtual machine monitors" (VMMs), "hypervisors," or virtualization "kernels." Because virtualization terminology has evolved over time and has not yet become fully standardized, these terms do not always provide clear distinctions between the software layers and components to which they refer.

In general, when implementing virtual machines, it is important to virtualize all useful functionalities of a physical machine. If functionality is not fully virtualized, then that feature becomes less useful in a virtual machine. Either that functionality cannot be used at all in a virtual machine, or it can only be used by one virtual machine at a time, if a "pass-through" mode to the physical resource is possible.

A problem exists, however, in the implementation of virtual machine resource reservations in certain clustering applications. For example, in certain clustering applications, SCSI-2 reservations are important for implementing application clustering functions. Such application clustering functionality is provided by products such as, for example, Microsoft Cluster Server® (MSCS) or Veritas Cluster Server® (VCS). To properly implement virtual machine resource reservations in an application clustering environment, SCSI-2 reservations should be fully virtualized. For example, the SCSI-2 RESERVE, RELEASE and RESET commands should be virtualized. As known by those skilled in the art, the SCSI-2 protocols were not originally developed with virtual machine technology support as an objective.

A common prior art setup is a two-machine cluster, where an application (e.g., Exchange® or Oracle®) runs on one machine (e.g., called the active node) and the other node (e.g., called the passive node) is available to take over if/when there is a failure. If the application fails on active node, the cluster software automatically starts up the application on the passive node. The data of the application is stored on a shared disk that is accessible by both machines. SCSI-2 reservations are used to protect the data on the shared disk, in case the application is accidentally started on more than one machine at once.

Utilizing a virtual machine architecture, where cluster software is executed on one or more virtual machines (e.g., virtual machine 200), would provide a number of advantages, particularly for scenarios that reduce the amount of hardware needed to get high availability. These scenarios often involve consolidating the passive nodes of many clusters into virtual machines that all run on the same physical machine. In this case, the shared storage may just be a single virtual disk with a single file system that contains the shared virtual disks for all the clusters. A problem exists, however, in the fact that prior art configurations cannot fully virtualize the SCSI-2 reservations that are expected to be existent by the cluster software. The cluster software expects to be able to lock out other applications from accessing a shared resource, in this case, a SCSI-2 compliant hard disk drive, disk drive array, or the like. The cluster software was written to function with a cluster of real machines, as opposed to one or more virtual machines. Consequently, in such a virtual machine architecture, SCSI-2 reservations on one shared virtual disk do not consistently and accurately prevent all access by other virtual machines to that disk, while not affecting access to the virtual disks of any other clusters.

DISCLOSURE OF THE INVENTION

Embodiments of the present invention implement a solution that can fully virtualize SCSI-2 reservations that are used by clustering software. Embodiments of the present invention enable clustering software to lock out other applications from accessing a shared resource, such as, for example, a SCSI-2 compliant hard disk drive, disk drive array, or the like, and fully provide their designed application clustering functionality (e.g., application fail over, etc.).

In one embodiment, a method of updating a cached version of data in a computer system upon a change of the data as stored in a shared storage system networked to the computer system comprises receiving, at the computer system, a notification from the shared storage system upon attempting to access the shared storage system. The computer system then determines that the notification occurred due to an unregistering of the computer system's access to the shared storage system by a second computer system that has updated the data stored in the shared storage system. As such, the computer system re-registers its access to the shared storage system and updates the cached version of the data with the data in the shared storage system that was updated by the second computer system.

In one embodiment, the present invention is implemented as a computer implemented method for providing virtual disk reservations on a storage medium for multiple distributed applications (e.g., clustering software applications). The method includes initializing a plurality of virtual disks, wherein each of the virtual disks is instantiated on a physical storage medium. The physical storage medium can be, for example, a disk drive, a logical disk (LUN) of a disk array, solid-state nonvolatile memory (e.g., FLASH RAM, etc.) or the like. A reservation status is determined for each of the virtual disks and the distributed applications that utilize the virtual disks are executed (e.g., two or more distributed applications sharing the physical storage medium). As the distributed applications are executed, a situation may occur which requires an update of the reservation status for one of the virtual disks.

In one embodiment, each of the virtual disks is related to corresponding metadata, and the metadata is configured to indicate a reservation status of a respective virtual disk. For example, in one embodiment, the metadata can include a reservation field that indicates which of a plurality of distributed applications holds a reservation for the respective virtual disk.

In one embodiment, upon an update of the reservation status for one of the virtual disks by a first distributed application, a notification indicator is set to notify a second distributed application of the update. The update is subsequently recognized and the notification indicator is cleared in order to continue I/O for the first distributed application and the second distributed application. In one embodiment, the notification is implemented by invalidating a plurality of registration keys for the physical storage medium, wherein the invalidating causes a discontinuance of I/O on the physical storage medium (e.g., causing I/O attempts to the physical storage medium to fail), which in turn, provides notification of the update to any process attempting access to the physical storage medium. In one embodiment, the invalidating is implemented by using a SCSI-3 unregistering command, such as, for example READKEYS, PREEMPT, and the like.

In this manner, embodiments of the present invention can fully virtualize physical resource reservations, such as SCSI-2 reservations, that are expected to be existent by popular distributed applications such as clustering software applications. For example, where the distributed applications are virtual machine clusters, the multiple passive nodes of multiple clusters can be consolidated on to virtual machines that all run on one physical machine. The SCSI-2 reservations expected to be existent by the clustering software are fully virtualized such that the cluster software can properly lock out other applications from accessing the shared resource (e.g., SCSI-2 disk drives, etc). This allows the clustering software to prevent accesses by other virtual machines while not affecting access to the virtual disks of other clusters.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE EMBODIMENTS

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature

Some portions of the detailed descriptions which follow are presented in terms of procedures, steps, logic blocks, processes, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "storing" or "accessing" or "virtualizing" or "preempting" or "executing" or the like, refer to the action and processes of a computer system (e.g., system 700 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the Invention

Figure 2:
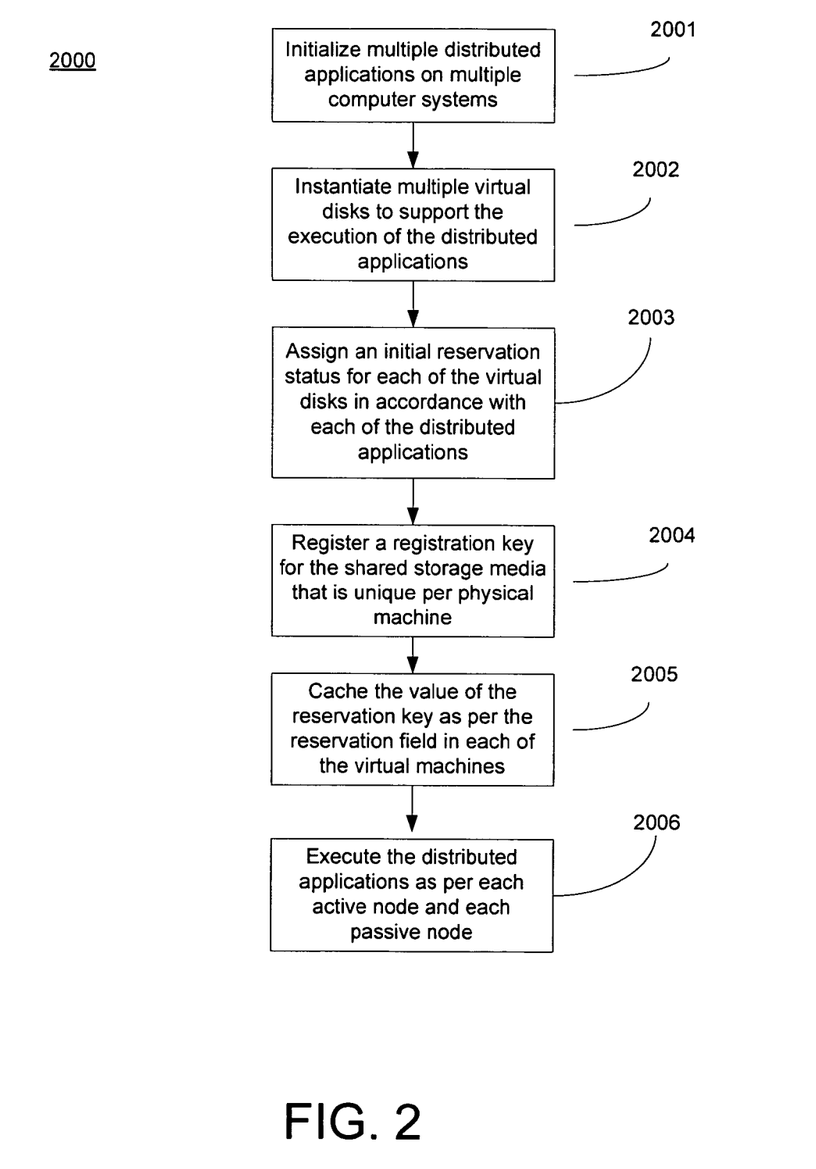
FIG. 2 shows a flowchart of the initialization of a distributed application and reservation process in accordance with one embodiment of the present invention.

FIG. 2 shows flowchart of the steps of an initialization process for multiple distributed applications executing on multiple computer systems in accordance with one embodiment of the present invention. As depicted in FIG. 2, process 2000 illustrates the operating steps of the initialization and instantiation of an exemplary virtual disk reservation process as implemented on a storage medium that supports multiple distributed applications. It should be noted that certain steps of process 2000 are described in the context of, and with reference to, FIG. 3 and FIG. 4 below.

The process 2000 embodiment of FIG. 2 begins in step 2001, with the initialization of multiple distributed applications on multiple computer systems. The distributed applications are typically software applications that are designed to execute cooperatively across two or more computer system platforms, or physical machines. Such software applications are at times referred to as cluster software, clustering applications, cluster servers, or the like. The cooperative execution across more than one computer system platform is typically used to increase the reliability and availability of the functions and/or services provided by the distributed application. Generally, the distributed application is designed to ensure that at least one computer system platform can take over in case of any failure or problems in another computer system platform. The distributed applications are now described with reference to FIG. 3 and FIG. 4.

Figure 3:
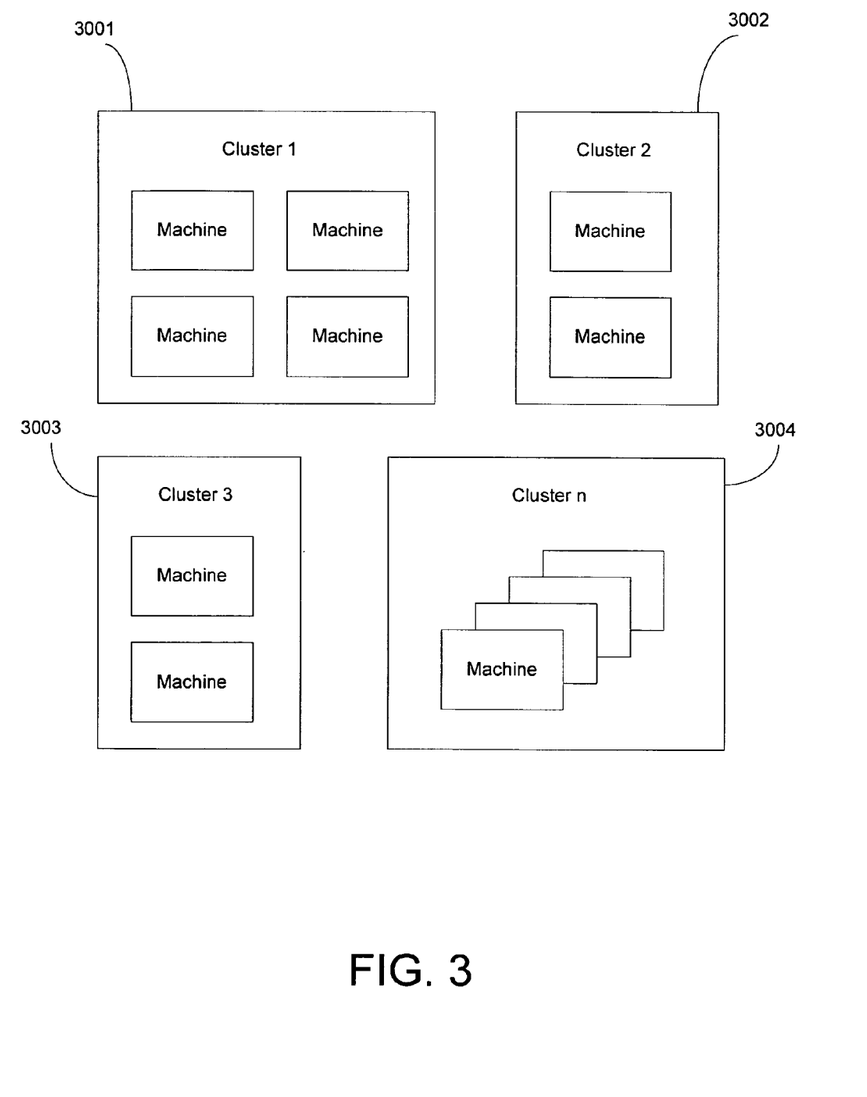
FIG. 3 shows a diagram illustrating a plurality of distributed applications in accordance with one embodiment of the present invention.

FIG. 3 shows a diagram illustrating a plurality of distributed applications in accordance with one embodiment of the present invention. As depicted in FIG. 3, four distributed applications 3001-3004 are explicitly shown, appropriately labeled "cluster 1" through "cluster n" although it should be noted that more than four such clusters can be supported. Each of the clusters includes a software component configured to execute on a computer system, shown in FIG. 3 as a "machine". Thus, for example, cluster 1 is a four machine cluster, while clusters 2 and 3 are two machine clusters. Cluster n (e.g., distributed application 3004) illustrates a larger cluster comprising a comparatively larger number of machines. For example, depending upon the particular application, cluster n can include 16 machines, 32 machines, or the like, depending upon the scale of the computing power required by the application.

Embodiments of the present invention advantageously utilize virtual machines to host one or more of the distributed application components as opposed to utilizing an actual physical machine. This attribute provides a number of advantages. For example, in many cases the distributed application is designed to operate with a primary machine, or active node, and a secondary machine, or passive node, where the primary machine provides the functionality associated with the distributed application and the secondary machine exists to provide a redundant backup capability in case any problem or service interruption occurs in the primary machine.

In large data centers, which host a large number of distributed applications, a brute force implementation of such distributed applications results in a large amount of hardware deployed simply to provide emergency backup capability in the event that there is a problem with the primary hardware. For example, to host 10 two-machine cluster applications, ten machines would be required to provide primary functionality while another ten machines would be required to provide backup functionality. This results in a large number of computer systems consuming electricity, requiring maintenance, and consuming space within a data center simply to provide insurance in case something goes wrong with one of the primary computer systems. Embodiments of the present invention overcome this disadvantage.

Figure 4:
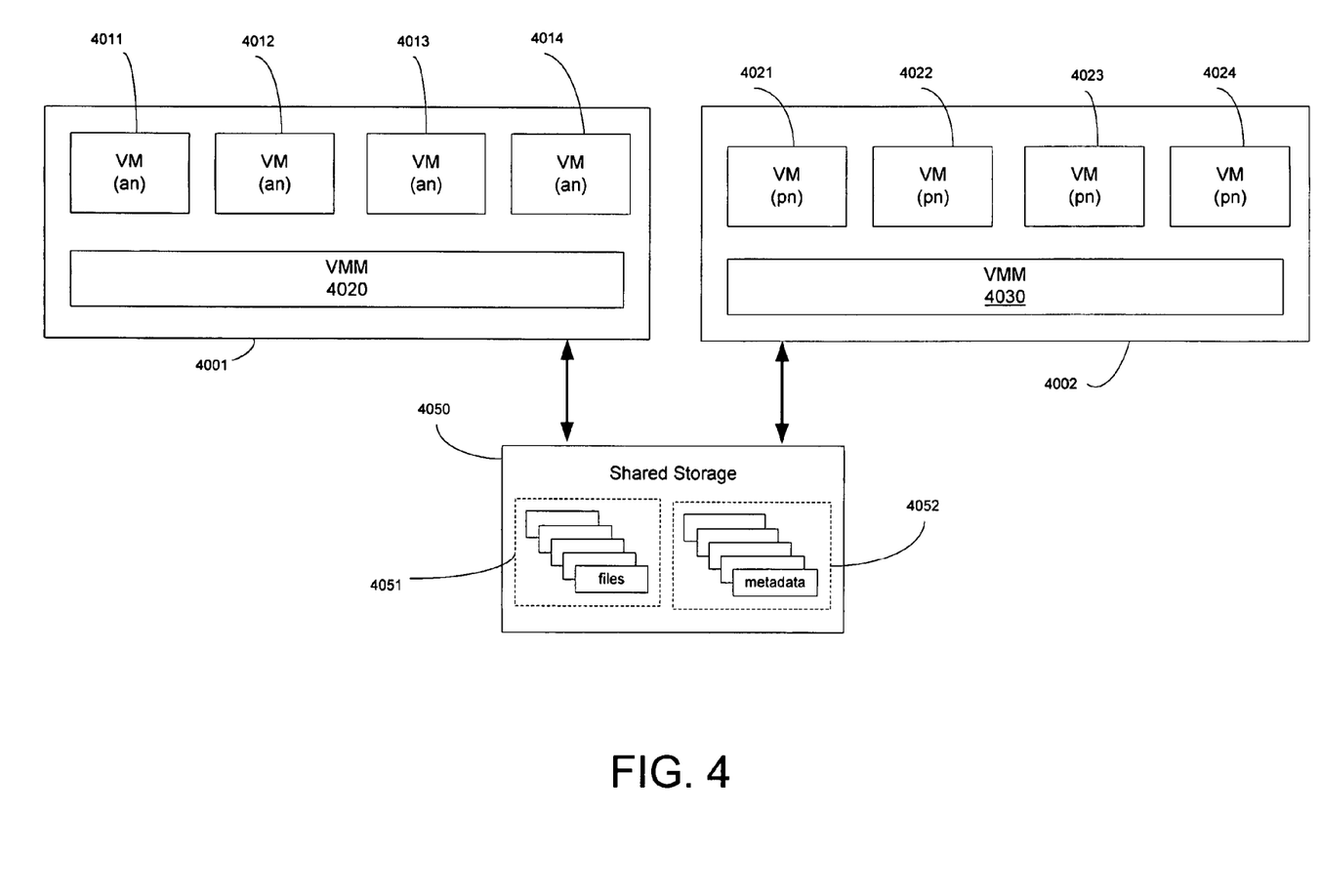
FIG. 4 shows a diagram of a distributed computer system as implemented using a plurality of virtual machines in accordance with one embodiment of the present invention.

FIG. 4 shows a diagram of a distributed computer system as implemented using a plurality of virtual machines in accordance with one embodiment of the present invention. As depicted in FIG. 4, two computer systems 4001 and 4002 are shown. The computer systems 4001 and 4002 are physical machines, or physical host computer systems (e.g., such as computer system 700 of FIG. 1) that provide a computer system hardware platform and one or more layers of system-level software (e.g., an operating system or similar kernel, I/O device drivers, and the like). The computer systems 4001 and 4002 also host respective virtual machine monitors 4020 and 4030, which in turn implement and support the virtual machines 4011-4014 and 4021-4024. The computer systems 4001 and 4002 are shown coupled to a shared storage medium 4050.

Embodiments of the present invention can utilize virtual machines to consolidate a number of active nodes onto one physical machine and a number of passive nodes onto another physical machine. Thus, for example, the active nodes of the distributed applications 3001-3004 of FIG. 3 can be consolidated onto one computer system (e.g., computer system 4001) and the passive nodes of the distributed applications 3001-3004 can be consolidated on to a second computer system (e.g., computer system 4002). The consolidation greatly reduces the costs of supporting the distributed applications while maintaining the high reliability/availability characteristics of using separate independent hardware platforms for the active nodes and the passive nodes. High reliability and high resource availability is maintained since no single physical machine failure can bring down one of the distributed applications 3001-3004. Each component of the distributed applications 3001-3004 executes on its own respective virtual machine. Thus, the services, I/O, and interfaces expected by each of the components needs to be fully virtualized in order to properly support their reliable execution.

With reference again to process 2000 of FIG. 2, in step 2002, multiple virtual disks are instantiated to support the execution of the distributed applications. As described in the discussion of FIG. 4, multiple components of the distributed applications can be configured to execute on their own respective virtual machines, and the services, I/O, and the like need to be fully virtualized to support proper execution. FIG. 4 shows the shared storage medium 4050 having a plurality of files 4051. In one embodiment, each of the files 4051 is used to instantiate corresponding respective virtual disks. Each of these virtual disks is related to corresponding respective "metadata" data structures 4052 that are also stored on the shared storage medium 4050.

In step 2003, an initial reservation status is assigned to each of the virtual disks 4051 in accordance with each of the distributed applications. In one embodiment, each of the virtual disks 4051 is used to support the execution of both an active node and a passive node, each of which executes within one of the virtual machines. For example, all the passive nodes of the distributed applications can be consolidated onto respective virtual machines on one computer system (e.g., computer system 4002) and all of their corresponding mass storage requirements (e.g., disk drives, etc.) can be consolidated onto a single shared storage medium (e.g., the shared storage medium 4050) as virtual disks.

In one embodiment, one or more of the virtual disks 4051 can be configured to support the execution of a cluster comprising two active nodes. In such an "active-active" configuration, the reservation status is used as a resource protection mechanism for the shared virtual disk between the two nodes, both of which are active. Since both nodes are active, as opposed to one being passive and the other active, the active-active distributed application would typically implement a more fine-grained, application-specific resource reservation scheme to prevent conflicting I/O to the shared virtual disk.

It should be noted that the term "reservation status" as used herein refers to whether a reservation is currently held, and which node (e.g., physical or virtual) holds the reservation. Accordingly, the term "change in reservation status" as used herein refers to a case where, typically, a passive node acquires a reservation on a virtual disk or is now reserving the virtual disk, after potentially breaking the reservation of the active node, or vice versa.

In one embodiment, the virtual disks are configured to virtualize SCSI-2 reservations that are used by many types of clustering software. Such SCSI-2 reservations enable clustering software to lock out other nodes from accessing a shared resource, such as, for example, a SCSI-2 compliant hard disk drive, disk drive array, or the like, and fully provide their designed application clustering functionality (e.g., application fail over, etc.).

Referring still to step 2003, it should be noted that the distributed file system holding the virtual disk files (e.g., a shared storage medium 4050) needs to allow files to be opened in a cross-machine, multi-writer mode, so that multiple virtual machines on many computer systems can open a shared virtual disk file. A pending patent application Ser. No. 10/773,613, now issued as U.S. Pat. No. 7,849,098, entitled "Providing Multiple Concurrent Access to a File System," which has been assigned to the assignee of this patent application, describes such a distributed file system. In one embodiment, each virtual disk file has an extra on-disk "RESV" field stored with its metadata (e.g., metadata 4052). In one embodiment, this RESV field is zero if there is no reservation on the virtual disk. In a case where SCSI-2 is being virtualized, if there is a virtual SCSI-2 reservation, then RESV stores the ID of the virtual machine that holds the reservation.

In step 2004, each of the physical machines 4001 and 4002 registers a registration key that is unique per physical machine. For example, the key may be some form of machine ID. This registration key is what will be used to notify each physical machine when the status of a virtual reservation has changed. In an embodiment where SCSI-2 is being virtualized, the notification mechanism uses physical SCSI-3 "registrants-only" reservations to perform the notifications. In this embodiment, each physical machine registers its unique registration key as its SCSI-3 registration key for the shared disk. Notification is accomplished by making a registrants-only reservation on the physical disk, and then unregistering each physical machine's SCSI-3 registration key. In other embodiments, there will be other ways to notify a machine using its unique key.

In step 2005, the virtual reservation status of a virtual disk is cached in each of the virtual machines that is accessing the virtual disk. In one embodiment, the module that implements the virtual SCSI-2 reservation of each of the virtual machines 4011-4014 and 4021-4024 caches the value of the RESV field for that file. For example, when a virtual machine of a cluster is initially powered on, it will open the shared virtual disk file associated with the cluster. When a virtual machine needs to issue an I/O to the virtual disk file, the I/O will be issued normally if the cached RESV field indicates that there is no reservation on the virtual disk or that the reservation is held by the current virtual machine. Therefore, as described above, I/O to the shared virtual disk will run with no slowdown in the normal, non-conflicting case. If the cached RESV field indicates that another virtual machine holds the reservation, then the RESV field is always re-read from the virtual disk to check if its value has been changed. If the RESV field still indicates a reservation is held by another virtual machine, then a reservation conflict is returned to the virtual machine for that I/O.

In step 2006, the distributed applications are executed as per each active node and each passive node. As described above, the distributed applications (e.g., cluster software) execute cooperatively across more than one machine (e.g., the virtual machines 4011-4014 and 4021-4024) to increase the reliability and availability of their functions and/or services.

With respect to the shared storage medium 4050 of FIG. 4, it should be noted that embodiments of the present invention are not limited to any particular type (or number) of memory device(s) or portions thereof that can be used to implement the shared storage medium 4050. Thus, for example, a memory device that includes a plurality of disks (e.g., SCSI disks, RAID devices, etc.) wherein each disk includes a plurality of user-defined portions, a memory device that includes a distributed file system having a plurality of files (or portions), a disk array that includes a plurality of logic unit numbers (LUNs) wherein each LUN includes a plurality of user-defined portions, are each within the spirit and scope of the invention.

Figure 5:
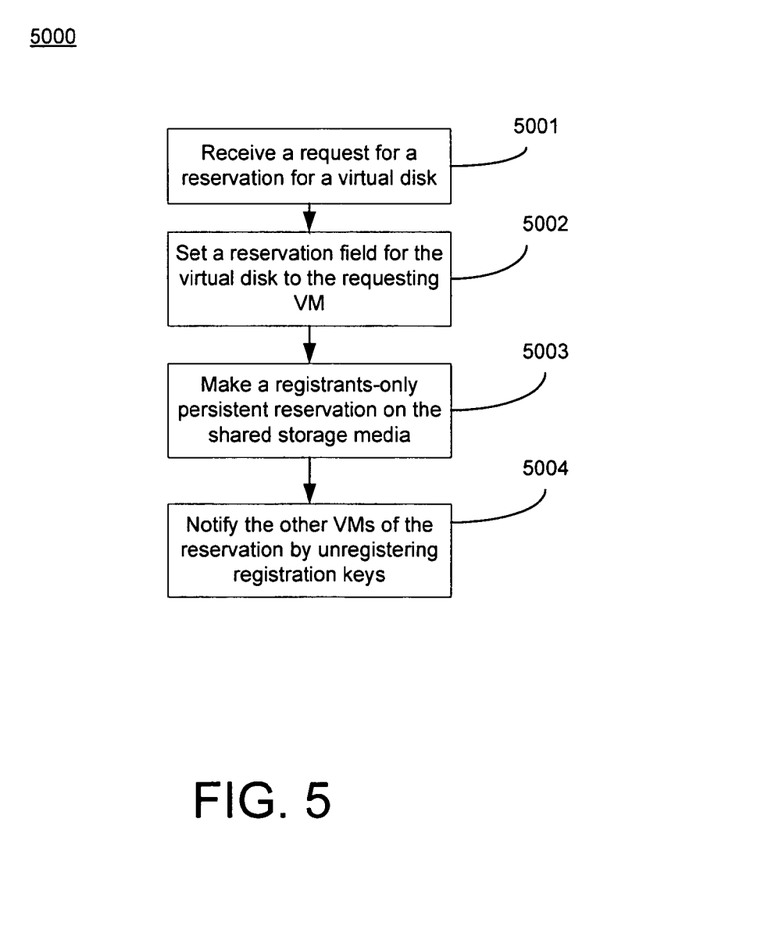
FIG. 5 shows a flowchart of a reservation change and a reservation notification process in accordance with one embodiment of the present invention.

FIG. 5 shows a flowchart of a process 5000 for changing the reservation status for one or more of the virtual disks residing on the shared storage medium in accordance with one embodiment of the present invention. When changing the reservation status of a virtual disk, embodiments of the present invention require a notification mechanism in order to notify other nodes about the status change. This notification mechanism can be implemented in a number of different ways, which should each be efficient and reliable. FIG. 5 (specifically steps 5003 and 5004) and FIG. 6 describe a preferred embodiment for sending and receiving a notification, which involves using SCSI-3 registrants-only reservations.

Process 5000 begins in step 5001 where a request is received from one of the distributed applications for a reservation for one of the virtual disks on the shared storage medium 4050. This can occur, for example, in a case where the services provided on an active node become faulty, fail, or otherwise transition to an indeterminate state, and these services are transferred to the passive node for resumption. Generally, when transferring services from an active node to the passive node, the virtual disk storing the data to support such services has its reservation status changed from the active node to the passive node. This ensures that data written to and relied upon by the passive node is not subsequently changed by any of the other nodes of the cluster/distributed application.

In step 5002, the reservation field (e.g., when in the metadata 4052) for the virtual disk is set to the requesting virtual machine (e.g., by setting to the current virtual machine's ID). This has the effect of reserving the virtual disk for that specific virtual machine. In one embodiment, the RESV field on the shared virtual disk is reread from the shared storage medium (e.g., physical SCSI-2 disk). If the RESV field is already set to indicate a reservation by this virtual machine, no further action need be taken. If the RESV field indicates a reservation by a different virtual machine, then a reservation conflict is returned. Setting the RESV field to the requesting virtual machines ID establishes the new reservation.

In step 5003, in the preferred embodiment, a SCSI-3 registrants-only persistent reservation is made on the shared storage medium 4050. This has the effect of only allowing registered agents (e.g., registered software applications) to perform I/O on the physical shared storage medium 4050.

Subsequently, in step 5004, the other virtual machines are notified of the new reservation by unregistering the SCSI-3 registration keys of all other physical machines and thereby causing their I/O to the shared storage medium 4050 to fail. As each other physical machine determines that its I/O is failing because its registration key has been unregistered, it will take the appropriate action to update its cached RESV fields (see the description of FIG. 6 below, for example). It will then re-register itself, and continue with normal execution of all its virtual machines.

The unregistering is able to notify the other virtual machines of a status change of a reservation without requiring the virtual machines or the virtual machine monitor to constantly check reservation status when performing I/O. The constant checking (e.g., as performed by a software routine that checks reservation status prior to implementing each I/O) would significantly slow down the execution of each of the virtual machines. The notification indicator of the embodiments of the present invention preempt I/O to a given virtual disk (e.g., by causing a conflict, causing the I/O to fail, etc.) without requiring that each virtual machine check reservation status prior to attempting virtual disk I/O.

In one embodiment, the notification indicator as described above is implemented by unregistering all the registration keys for the other physical machines by using the SCSI-3 READKEYS and PREEMPT commands. As described above, this preempts I/O from the other physical machines. The result is that virtual machines on all other physical machines will immediately start getting reservation conflicts on all I/O to this physical disk (e.g., shared storage medium 4050). It should be noted that there are other possible SCSI-3 commands that may be used for this purpose, including READ FULL STATUS and PREEMPT AND ABORT. The resulting conflicts and failed I/O attempts prompt the other physical machines to re-read the value of RESV fields on the virtual disks and determine whether the reservation status has changed.

Figure 6:
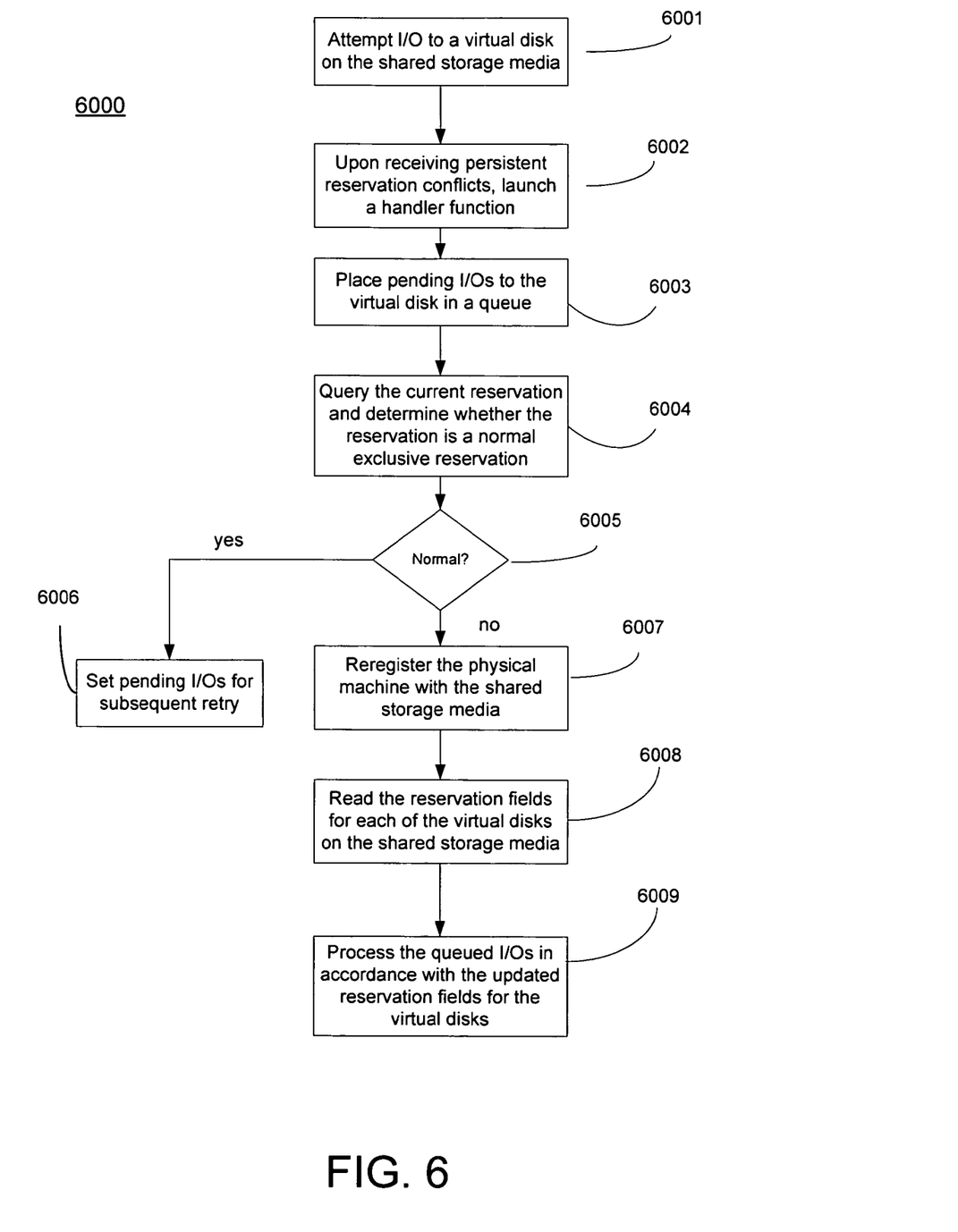
FIG. 6 shows a flowchart of a process for recognizing a reservation change in accordance with one embodiment of the present invention.

FIG. 6 shows a flowchart of a process 6000 for recognizing a change in the reservation status for one or more of the virtual disks residing on the shared storage medium in accordance with one embodiment of the present invention. As depicted in FIG. 6, process 6000 illustrates the operating steps where a given distributed application recognizes a situation where the reservation status of a virtual disk has been changed by another of the distributed applications.

Process 6000 begins in step 6001 when a distributed application attempts I/O to a virtual disk on the shared storage medium 4050. In step 6002, upon receiving persistent reservation conflicts, a handler function is launched to determine whether the conflicts are due to a change in reservation status by one of the other applications (e.g., conflicts resulting from a notification).

In one embodiment, a virtual reservation module (e.g., implemented as part of the virtual machine monitors 4020 and 4030) is configured to resolve reservation conflicts on any I/O to the shared storage medium 4050. When an I/O gets a persistent reservation conflict, the virtual reservation module launches the handler function in a process context (e.g., so it can perform blocking I/O), if one is not already started. In one embodiment, the handler can also run as a series of callbacks instead of a separate process, though such an implementation would be more complex.

In step 6003, all incoming I/O requests and replies to the virtual disk are placed in request or reply queues instead of being handled immediately. This allows the pending I/Os to be ordered and stored for correct fulfillment after the handler finishes processing.

In step 6004, the handler queries the current reservation and determines whether the reservation is a normal exclusive reservation. If the actual I/O getting the reservation conflict is to a non-shared virtual disk or the reservation is a normal exclusive reservation (i.e. not a registrants-only reservation), then the I/O can be returned immediately for fulfillment. Otherwise, the I/O should also be saved on a reply queue until all other I/Os can complete and the handler function finishes.

In step 6005, if the reservation experiencing conflicts is a normal reservation, process 6000 proceeds to step 6006 where the pending I/Os are returned for subsequent retry and fulfillment, otherwise the conflicts were caused by a notification by another virtual machine and process 6000 proceeds to step 6007.

In step 6007, the handler function reregisters the physical machine with the shared storage medium 4050. Once all outstanding I/Os have completed, the handler function reregisters the physical machine with its normal registration key in order to re-enable access to the shared storage medium 4050.

In step 6008, the handler function refreshes the cached reservation field for each of the shared virtual disks (e.g., by reading the RESV field for each of the disks in the metadata 4052), thereby capturing any change in reservation status for any of the virtual disks.

Subsequently, in step 6009, the handler function finishes its execution by processing the queued I/Os in accordance with the updated reservation fields for the virtual disks. In so doing, those I/Os experiencing conflicts because of the changed reservation to a virtual disk are returned reflecting the reservation conflict, while the other I/Os are returned for subsequent retry and fulfillment. When all the queued I/Os have been processed, the distributed application continues execution in accordance with the reservations (e.g., as updated) for each of the virtual disks.

In this manner, an update of the reservation status is recognized by each of the virtual machines. The update of the reservation status and the recognition by each of the virtual machines is implemented such that it prevents access by other virtual machines of a given cluster to that cluster's virtual disk, but does not affect access to the virtual disks of other clusters. It should be noted that I/O by the notifying node is never interrupted, since it does not need to notify/unregister itself. Accordingly, process 6000 would not have to be implemented for the notifying node.

It should be noted that, in a SCSI-3 based embodiment, the file system itself may sometimes need to make an exclusive SCSI-3 reservation for purposes of atomicity. If there is no existing SCSI-3 reservation, then it will just acquire an exclusive persistent reservation, and then release this reservation when it has completed the operation. However, the necessary procedure must be modified if there is already a registrants-only reservation. In this case, it will use the SCSI-3 PREEMPT request to upgrade the registrants-only reservation to an exclusive reservation, and it will also use PREEMPT to downgrade the exclusive reservation back to a registrants-only reservation.

In such an embodiment, there may exist a subtle problem that must be solved. For example, if the machine holding the current registrants-only reservation (machine A) tries to upgrade its reservation to exclusive just as another machine (machine B) is also trying to upgrade the reservation to exclusive, then a problematic situation may occur where machine A's upgrade via PREEMPT succeeds, but then machine B's PREEMPT operation steals the reservation that machine A just made.

This problem can be solved in several ways. For example, in one embodiment, machine A will actually get a reservation conflict when it accesses the disk, even though it thought that it had an exclusive reservation. So, it just needs to detect this situation and retry on getting the reservation later. Alternatively, machine A could change its registration key just prior to doing the upgrade of the reservation. Machine B will not be able to PREEMPT machine A's reservation at all, because it will not specify the correct key of machine A.

It should also be noted that, because there is some extra cost to upgrading to an exclusive reservation from a registrants-only reservation rather than getting an exclusive reservation, it is preferable to eliminate the registrants-only reservation when possible. Therefore, in one embodiment, the registrants-only persistent reservation is removed when it can be determined that all nodes have seen the notification. There are many possible tests for determining when the registrants-only reservation can be removed. The simplest method is to remove the registrants-only reservation when all machines that were registered at the time it was acquired have re-registered (e.g., re-registered their SCSI-3 keys) after having been unregistered. In one embodiment, the list of machines that have registered keys can be monitored by the SCSI-3 READ KEYS command. Also, machines will notice that they have been un-registered and will re-register fairly quickly if they are doing some kind of "heartbeating" mechanism to disk.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method of updating a cached version of data in a computer system upon a change of the data as stored in a shared storage system networked to the computer system, the method comprising:
    receiving, at the computer system, a notification from the shared storage system upon attempting to access the shared storage system, wherein the notification indicates the computer system is unable to access the shared storage system;
    interpreting that the notification indicating the computer system is unable to access the shared storage system occurred due to an unregistering of the computer system's access to the shared storage system by a second computer system that has updated the data stored in the shared storage system;
    re-registering access of the computer system to the shared storage system; and
    updating the cached version of the data with the data in the shared storage system that was updated by the second computer system.

2. The method of claim 1, wherein the notification indicates a failure to access the shared storage system.

3. The method of claim 2, wherein the failure is interpreted as the unregistering of the computer system's access to the shared storage system by the second computer system that has updated the data stored in the shared storage system.

4. The method of claim 1, wherein the data is a reservation status for a file stored in the shared storage system that is accessible by both the computer system and the second computer system.

5. The method of claim 4, wherein the updated data reflects that the second computer system has acquired a reservation to modify the file.

6. The method of claim 4, wherein the determining step comprises determining that the cached version of data prior to the updating step is not an exclusive reservation status.

7. The method of claim 4, wherein the file is a virtual disk file accessible by a first virtual machine running on the computer system and a second virtual machine running on the second computer system.

8. The method of claim 7, performed within a virtual machine monitor of the computer system.

9. The method of claim 8, wherein the unregistering of the computer system's access to the shared storage system results from an issuance of a SCSI-3 registrants-only operation to the shared storage system by the second computer system and the reservation status for the virtual disk is a SCSI-2 reservation value.

10. A non-transitory computer-readable storage medium comprising instructions for updating a cached version of data in a computer system upon a change of the data as stored in a shared storage system networked to the computer system by perform the steps of:
    receiving, at the computer system, a notification from the shared storage system upon attempting to access the shared storage system, wherein the notification indicates the computer system is unable to access the shared storage system;

interpreting that the notification indicating the computer system is unable to access the shared storage system occurred due to an unregistering of the computer system's access to the shared storage system by a second computer system that has updated the data stored in the shared storage system;

re-registering access of the computer system to the shared storage system; and updating the cached version of the data with the data in the shared storage system that was updated by the second computer system.

11. The method of claim 1, wherein the notification indicates a conflict to access the shared storage system and the conflict is interpreted as the unregistering of the computer system's access to the shared storage system by the second computer system that has updated the data stored in the shared storage system.

12. The non-transitory computer-readable storage medium of claim 10, wherein the notification indicates a failure to access the shared storage system.

13. The non-transitory computer-readable storage medium of claim 10, wherein the data is a reservation status for a file stored in the shared storage system that is accessible by both the computer system and the second computer system.

14. The non-transitory computer-readable storage medium of claim 13, wherein the updated data reflects that the second computer system has acquired a reservation to modify the file.

15. The non-transitory computer-readable storage medium of claim 13, wherein the determining step comprises determining that the cached version of data prior to the updating step is not an exclusive reservation status.

16. The non-transitory computer-readable storage medium of claim 13, wherein the file is a virtual disk file accessible by a first virtual machine running on the computer system and a second virtual machine running on the second computer system.

17. The non-transitory computer-readable storage medium of claim 16, performed within a virtual machine monitor of the computer system.

18. The non-transitory computer-readable storage medium of claim 17, wherein the unregistering of the computer system's access to the shared storage system results from an issuance of a SCSI-3 registrants-only operation to the shared storage system by the second computer system and the reservation status for the virtual disk is a SCSI-2 reservation value.

19. A computer system comprising a processor configured to update a cached version of data in the computer system upon a change of the data as stored in a shared storage system networked to the computer system by performing the steps of:

receiving, at the computer system, a notification from the shared storage system upon attempting to access the shared storage system, wherein the notification indicates the computer system is unable to access the shared storage system;

determining that the notification indicating the computer system is unable to access the shared storage system occurred due to an unregistering of the computer system's access to the shared storage system by a second computer system that has updated the data stored in the shared storage system;

re-registering access of the computer system to the shared storage system; and updating the cached version of the data with the data in the shared storage system that was updated by the second computer system.

20. The computer system of claim 19, wherein the data is a reservation status for a file stored in the shared storage system that is accessible by both the computer system and the second computer system.

21. The method of claim 20, wherein the updated data reflects that the second computer system has acquired a reservation to modify the file.

22. The method of claim 20, wherein the determining step comprises determining that the cached version of data prior to the updating step is not an exclusive reservation status.

* * * * *